(12) United States Patent
Anderson et al.

(10) Patent No.: US 9,239,735 B2
(45) Date of Patent: Jan. 19, 2016

(54) COMPILER-CONTROL METHOD FOR LOAD SPECULATION IN A STATICALLY SCHEDULED MICROPROCESSOR

(71) Applicant: Texas Instruments Incorporated, Dallas, TX (US)

(72) Inventors: Timothy D. Anderson, University Park, TX (US); Joseph Zbiciak, Farmers Branch, TX (US); Duc Q. Bui, Grand Prairie, TX (US); Mel A. Phipps, Sugar Land, TX (US); Todd T. Hahn, Sugar Land, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/334,352

(22) Filed: Jul. 17, 2014

(65) Prior Publication Data

US 2015/0026444 A1 Jan. 22, 2015

Related U.S. Application Data

(60) Provisional application No. 61/847,168, filed on Jul. 17, 2013.

(51) Int. Cl.
*G06F 9/45* (2006.01)
*G06F 9/48* (2006.01)
*G06F 9/44* (2006.01)
*G06F 9/38* (2006.01)

(52) U.S. Cl.
CPC ............... *G06F 9/4881* (2013.01); *G06F 8/30* (2013.01); *G06F 8/443* (2013.01); *G06F 9/3802* (2013.01)

(58) Field of Classification Search
CPC ........................................................ G06F 8/443
USPC .................................................. 717/151, 152
See application file for complete search history.

(56) References Cited

U.S. PATENT DOCUMENTS

| | | | | |
|---|---|---|---|---|
| 5,948,095 | A * | 9/1999 | Arora et al. .................... | 712/200 |
| 6,202,204 | B1 * | 3/2001 | Wu ......................... | G06F 8/433 |
| | | | | 712/E9.047 |
| 6,539,541 | B1 * | 3/2003 | Geva ........................ | G06F 8/443 |
| | | | | 712/233 |
| 6,615,403 | B1 * | 9/2003 | Muthukumar et al. ........ | 717/160 |
| 6,631,452 | B1 * | 10/2003 | Lin ...................... | G06F 9/30043 |
| | | | | 711/154 |
| 2003/0105942 | A1 * | 6/2003 | Damron ................. | G06F 9/3842 |
| | | | | 712/216 |

OTHER PUBLICATIONS

Bernstein et al., "Providing Safety of Speculative Load Instructions at Compile-Time", 1992.*
Rogers et al., "Software Support for Speculative Loads", 1992.*

* cited by examiner

*Primary Examiner* — Phillip H Nguyen
(74) *Attorney, Agent, or Firm* — Robert D. Marshall, Jr.; Frank D. Cimino

(57) ABSTRACT

A statically scheduled processor compiler schedules a speculative load in the program before the data is needed. The compiler inserts a conditional instruction confirming or disaffirming the speculative load before the program behavior changes due to the speculative load. The condition is not based solely upon whether the speculative load address is correct but preferably includes dependence according to the original source code. The compiler may statically schedule two or more branches in parallel with orthogonal conditions.

17 Claims, 11 Drawing Sheets

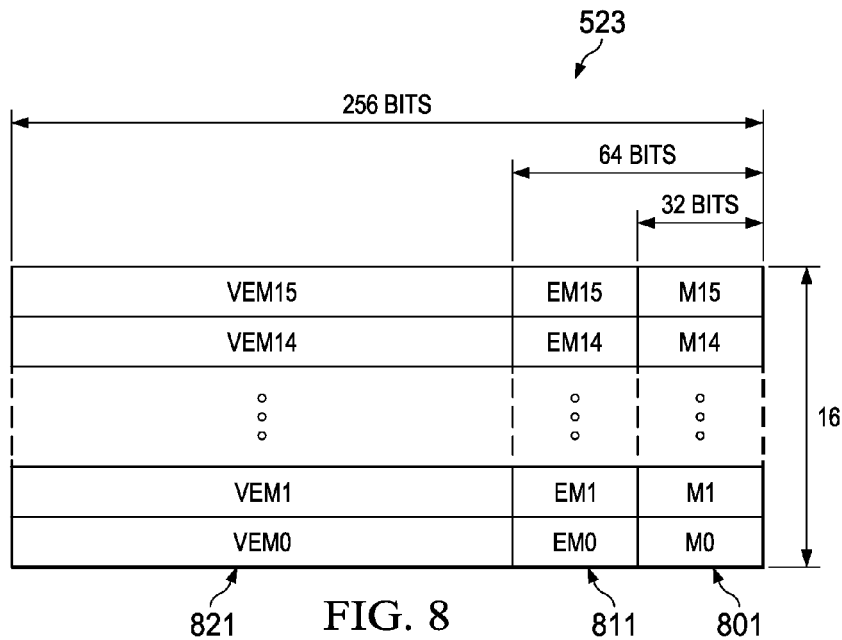
FIG. 8
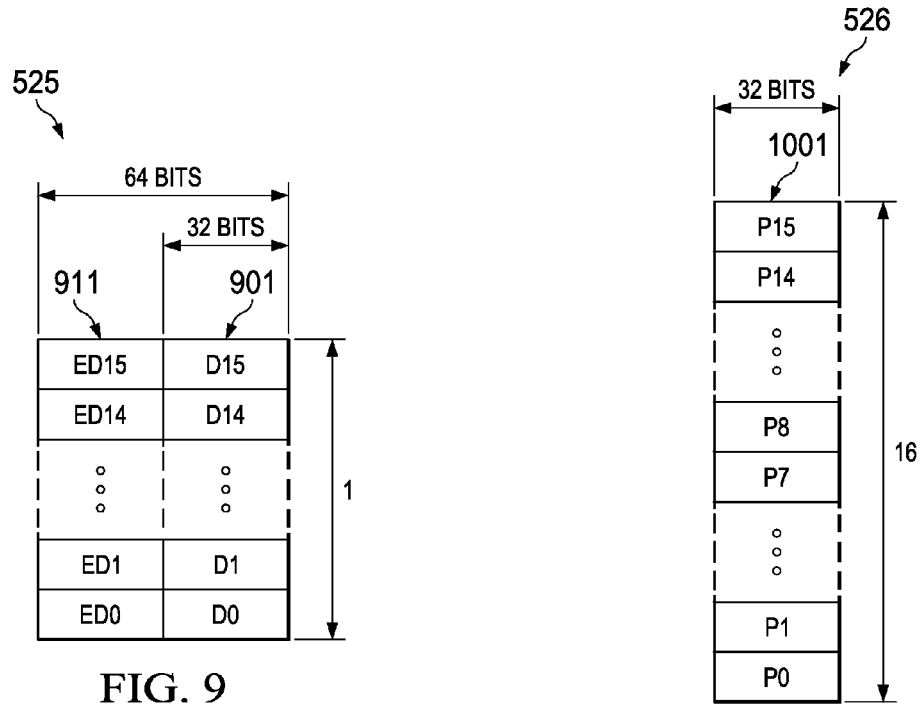
FIG. 9
FIG. 10

COMPILER-CONTROL METHOD FOR LOAD SPECULATION IN A STATICALLY SCHEDULED MICROPROCESSOR

CLAIM OF PRIORITY

This application claims priority under 35 U.S.C. 119(e)(1) to U.S. Provisional Application No. 61/847,168 filed Jul. 17, 2013.

TECHNICAL FIELD OF THE INVENTION

The technical field of this invention is digital data processing and more specifically compiler control of load operations.

BACKGROUND OF THE INVENTION

Loading data as early as possible is very useful for increasing the speed of the systems. If the data is not in the cache when loaded by the program, execution must wait while the data is retrieved from memory. To help reduce this latency, the compiler can speculatively hoist a load up early in the instruction stream, before knowing for sure if the address is any good.

SUMMARY OF THE INVENTION

A statically scheduled processor compiler schedules a speculative load in the program before the data is needed. The compiler inserts a conditional instruction confirming or disaffirming the speculative load before the program behavior changes due to the speculative load. The condition is not based solely upon whether the speculative load address is correct but preferably includes dependence according to the original source code. The compiler may statically schedule two or more branches in parallel with orthogonal conditions.

BRIEF DESCRIPTION OF THE DRAWINGS

These and other aspects of this invention are illustrated in the drawings, in which:

FIG. 8 illustrates the local vector register file shared by the multiply and correlation functional units;

FIG. 9 illustrates local register file of the load/store unit;

FIG. 10 illustrates the predicate register file;

DETAILED DESCRIPTION OF PREFERRED EMBODIMENTS

Figure 1:
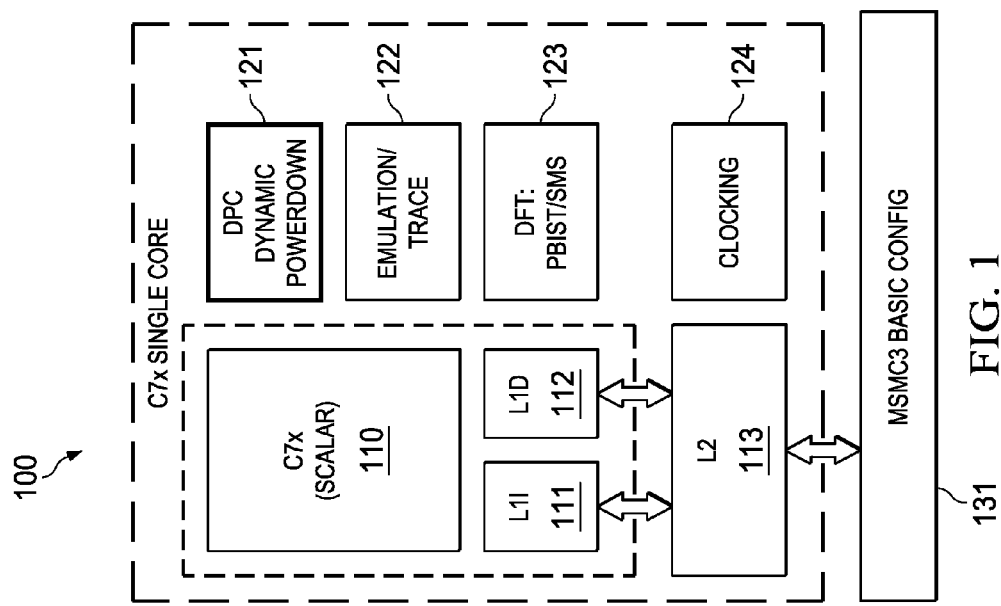
FIG. 1 illustrates a single core scalar processor according to one embodiment of this invention.

FIG. 1 illustrates a single core scalar processor according to one embodiment of this invention. Single core processor 100 includes a scalar central processing unit (CPU) 110 coupled to separate level one instruction cache (L1I) 111 and level one data cache (L1D) 112. Central processing unit core 110 could be constructed as known in the art and would typically include a register file, an integer arithmetic logic unit, an integer multiplier and program flow control units. Single core processor 100 includes a level two combined instruction/data cache (L2) 113 that holds both instructions and data. In the preferred embodiment scalar central processing unit (CPU) 110, level one instruction cache (L1I) 111, level one data cache (L1D) 112 and level two combined instruction/data cache (L2) 113 are formed on a single integrated circuit.

In a preferred embodiment this single integrated circuit also includes auxiliary circuits such as power control circuit 121, emulation/trace circuits 122, design for test (DST) programmable built-in self test (PBIST) circuit 123 and clocking circuit 124. External to CPU 110 and possibly integrated on single integrated circuit 100 is memory controller 131.

CPU 110 operates under program control to perform data processing operations upon defined data. The program controlling CPU 110 consists of a plurality of instructions that must be fetched before decoding and execution. Single core processor 100 includes a number of cache memories. FIG. 1 illustrates a pair of first level caches. Level one instruction cache (L1I) 111 stores instructions used by CPU 110. CPU 110 first attempts to access any instruction from level one instruction cache 121. Level one data cache (L1D) 112 stores data used by CPU 110. CPU 110 first attempts to access any required data from level one data cache 112. The two level one caches (L1I 111 and L1D 112) are backed by a level two unified cache (L2) 113. In the event of a cache miss to level one instruction cache 111 or to level one data cache 112, the requested instruction or data is sought from level two unified cache 113. If the requested instruction or data is stored in level two unified cache 113, then it is supplied to the requesting level one cache for supply to central processing unit core 110. As is known in the art, the requested instruction or data may be simultaneously supplied to both the requesting cache and CPU 110 to speed use.

Level two unified cache 113 is further coupled to higher level memory systems via memory controller 131. Memory controller 131 handles cache misses in level two unified cache 113 by accessing external memory (not shown in FIG. 1). Memory controller 131 handles all memory centric functions such as cacheabilty determination, error detection and correction, address translation and the like. Single core processor 100 may be a part of a multiprocessor system. In that case memory controller 131 handles data transfer between processors and maintains cache coherence among processors.

Figure 2:
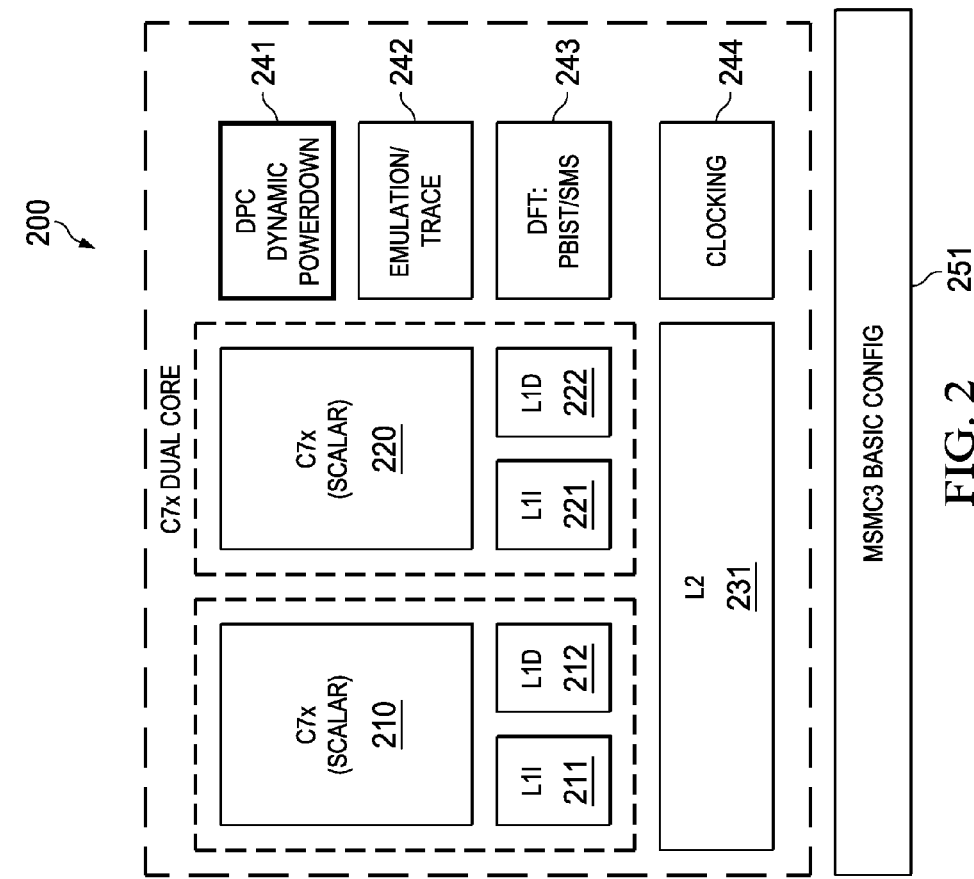
FIG. 2 illustrates a dual core scalar processor according to another embodiment of this invention.

FIG. 2 illustrates a dual core processor according to another embodiment of this invention. Dual core processor 200 includes first CPU 210 coupled to separate level one instruction cache (L1I) 211 and level one data cache (L1D) 212 and second CPU 220 coupled to separate level one instruction cache (L1I) 221 and level one data cache (L1D) 212. Central processing units 210 and 220 are preferably constructed similar to CPU 110 illustrated in FIG. 1. Dual core processor 200 includes a single shared level two combined instruction/data cache (L2) 231 supporting all four level one caches (L1I 211, L1D 212, L1I 221 and L1D 222). In the preferred embodiment CPU 210, level one instruction cache (L1I) 211, level one data cache (L1D) 212, CPU 220, level one instruction cache (L1I) 221, level one data cache (L1D) 222 and level two combined instruction/data cache (L2) 231 are formed on a single integrated circuit. This single integrated circuit preferably also includes auxiliary circuits such as power control circuit 245, emulation/trace circuits 116, design for test (DST) programmable built-in self test (PBIST) circuit 117 and clocking circuit 118. This single integrated circuit may also include memory controller 251.

Figure 3:
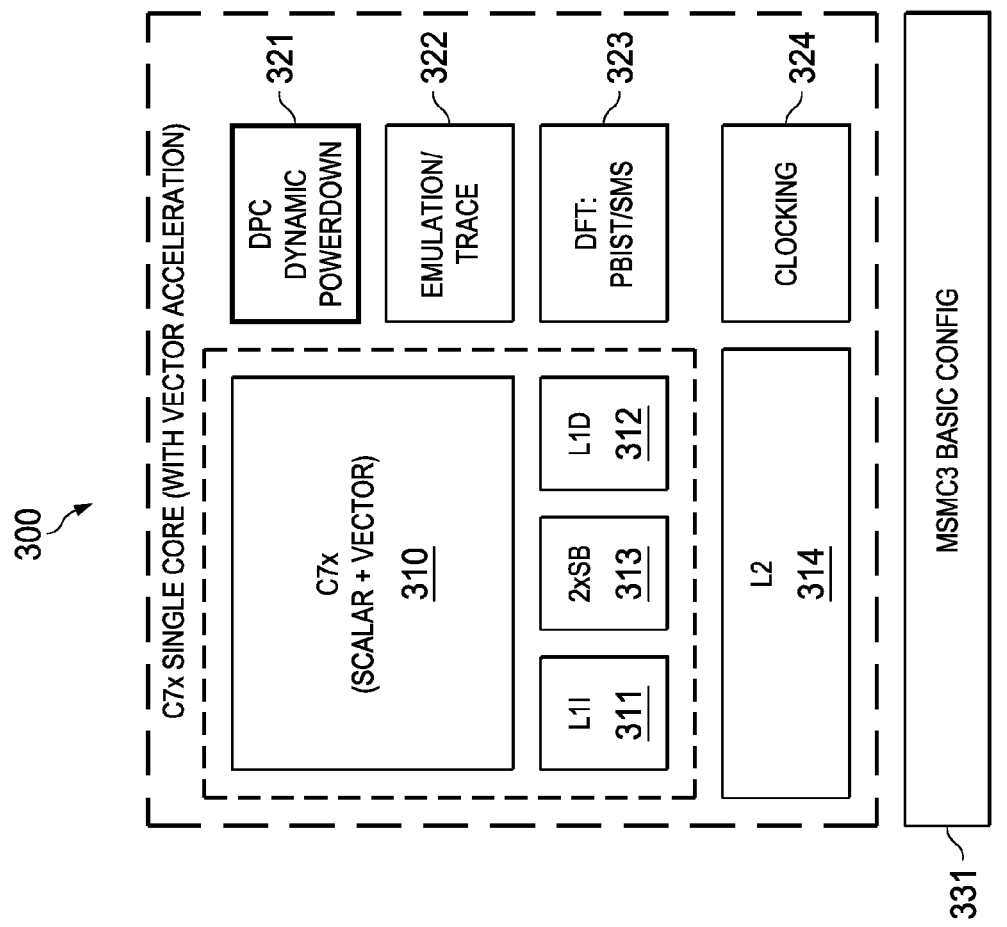
FIG. 3 illustrates a single core vector processor according to a further embodiment of this invention.
Figure 4:
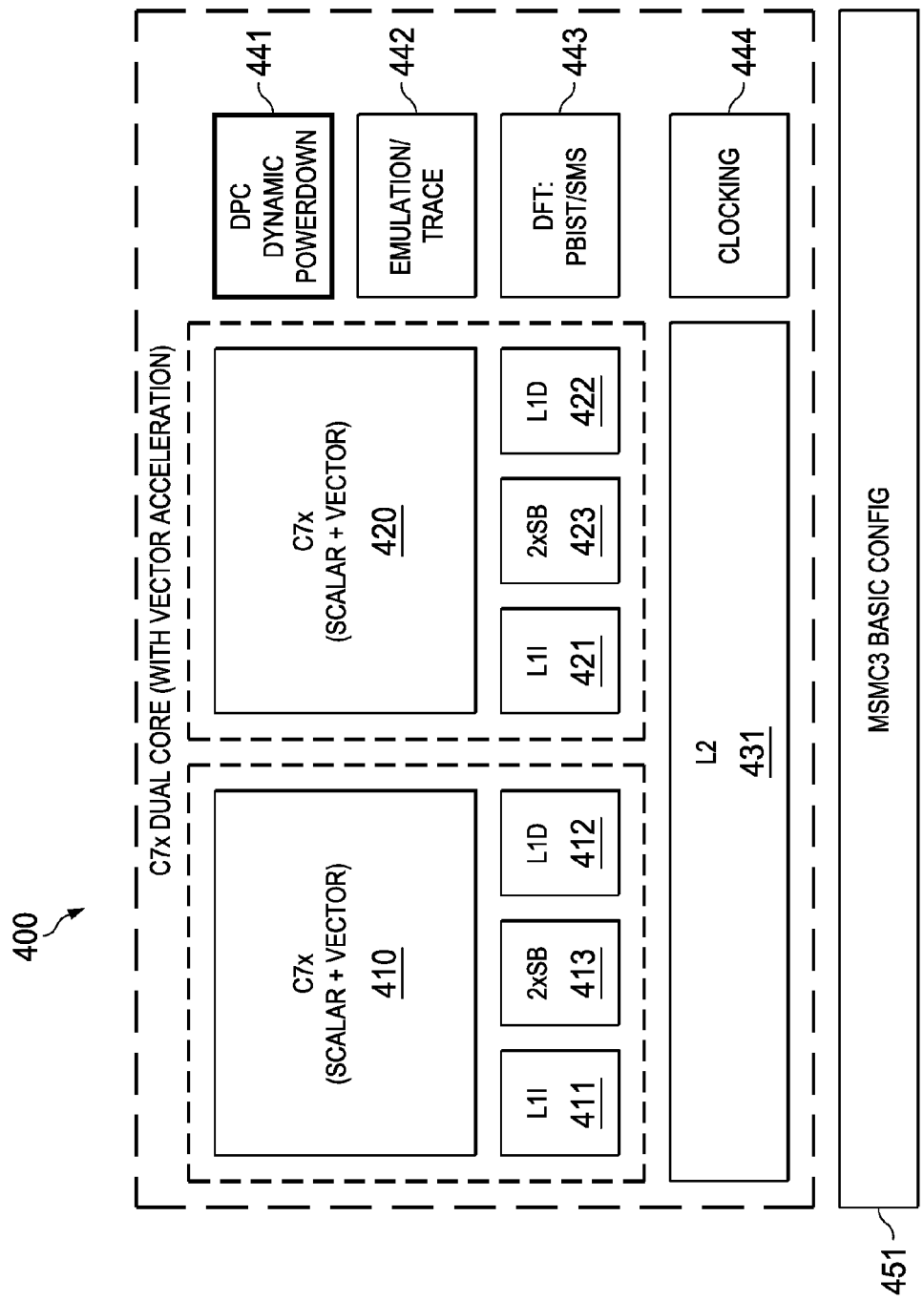
FIG. 4 illustrates a dual core vector processor according to a further embodiment of this invention.

FIGS. 3 and 4 illustrate single core and dual core processors similar to that shown respectively in FIGS. 1 and 2. FIGS. 3 and 4 differ from FIGS. 1 and 2 in showing vector central processing units. As further described below Single core vector processor 300 includes a vector CPU 310. Dual core vector processor 400 includes two vector CPUs 410 and 420. Vector CPUs 310, 410 and 420 include wider data path operational units and wider data registers than the corresponding scalar CPUs 110, 210 and 220.

Figure 5:
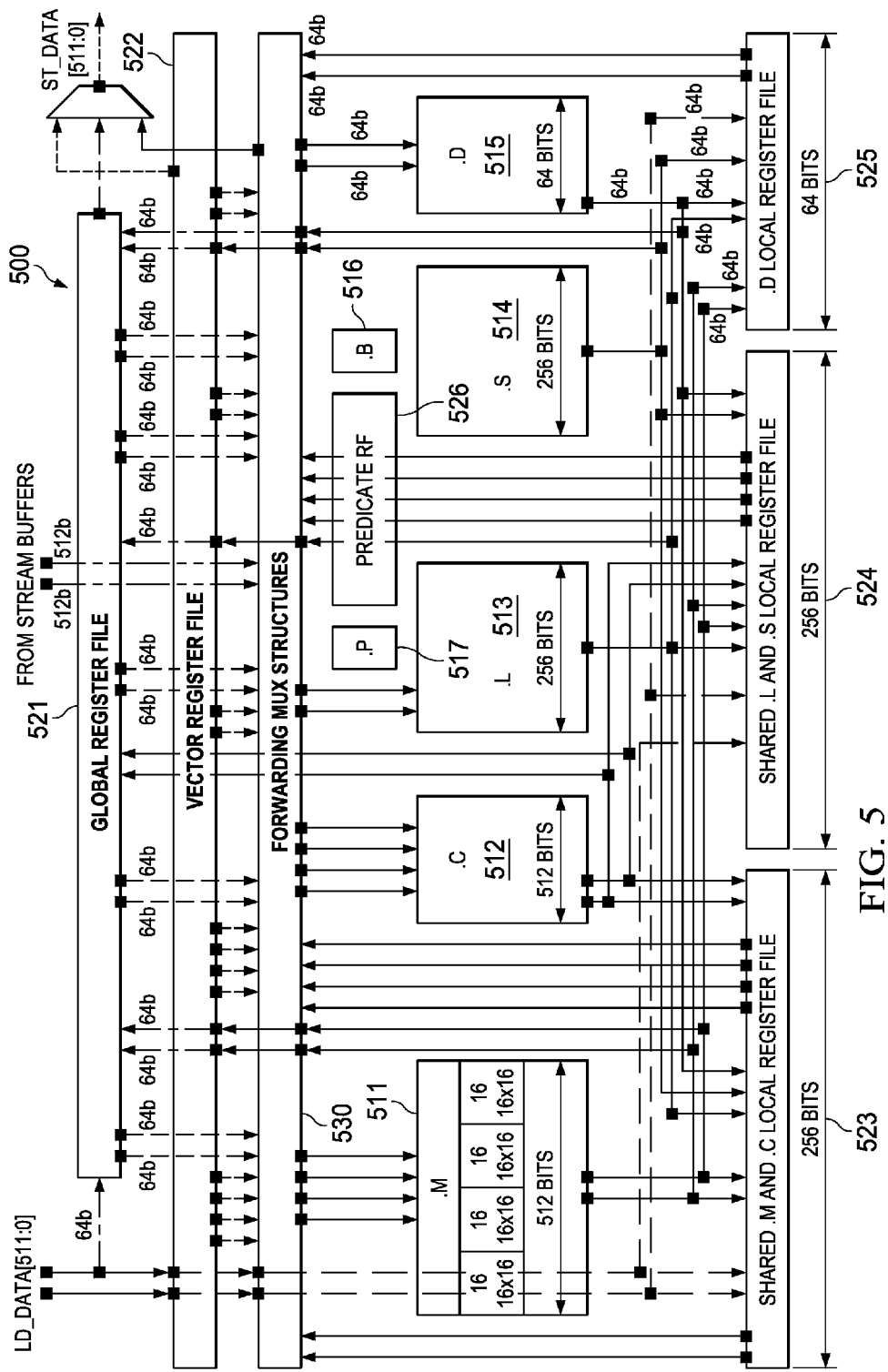
FIG. 5 illustrates construction of one embodiment of the CPU of this invention.

Vector CPUs 310, 410 and 420 further differ from the corresponding scalar CPUs 110, 210 and 220 in the inclusion of streaming engine 313 (FIG. 3) and streaming engines 413 and 423 (FIG. 5). Streaming engines 313, 413 and 423 are similar. Streaming engine 313 transfers data from level two unified cache 313 (L2) to a vector CPU 310. Streaming engine 413 transfers data from level two unified cache 431 to vector CPU 410. Streaming engine 423 transfers data from level two unified cache 431 to vector CPU 420. In accordance with the preferred embodiment each streaming engine 313, 413 and 423 manages up to two data streams.

Each streaming engine 313, 413 and 423 transfer data in certain restricted circumstances. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have fixed sequence of elements. Thus programs cannot seek randomly within the stream. The stream data is read-only while active. Programs cannot write to a stream while simultaneously reading from it. Once a stream is opened the streaming engine: calculates the address; fetches the defined data type from level two unified cache; performs data type manipulation such as zero extension, sign extension, data element sorting/swapping such as matrix transposition; and delivers the data directly to the programmed execution unit within the CPU. Streaming engines are thus useful for real-time digital filtering operations on well-behaved data. Streaming engines free these memory fetch tasks from the corresponding CPU enabling other processing functions.

The streaming engines provide the following benefits. The permit multi-dimensional memory accesses. They increase the available bandwidth to the functional units. They minimize the number of cache miss stalls since the stream buffer can bypass L1D cache and L2 cache. They reduce the number of scalar operations required in the loop to maintain. They manage the address pointers. They handle address generation automatically freeing up the address generation instruction slots and the .D unit for other computations.

FIG. 5 illustrates construction of one embodiment of the CPU of this invention. Except where noted this description covers both scalar CPUs and vector CPUs. The CPU of this invention includes plural execution units multiply unit 511 (.M), correlation unit 512 (.C), arithmetic unit 513 (.L), arithmetic unit 514 (.S), load/store unit 515 (.D), branch unit 516 (.B) and predication unit 517 (.P). The operation and relationships of these execution units are detailed below.

Multiply unit 511 primarily preforms multiplications. Multiply unit 511 accepts up to two double vector operands and produces up to one double vector result. Multiply unit 511 is instruction configurable to perform the following operations: various integer multiply operations, with precision ranging from 8-bits to 64-bits multiply operations; various regular and complex dot product operations; and various floating point multiply operations; bit-wise logical operations, moves, as well as adds and subtracts. As illustrated in FIG. 5 multiply unit 511 includes hardware for four simultaneous 16 bit by 16 bit multiplications. Multiply unit 511 may access global scalar register file 521, global vector register file 522 and shared .M and C. local register 523 file in a manner described below. Forwarding multiplexer 530 mediates the data transfer between global scalar register file 521, global vector register file 522, the corresponding streaming engine and multiply unit 511.

Correlation unit 512 (.C) accepts up to two double vector operands and produces up to one double vector result. Correlation unit 512 supports these major operations. In support of WCDMA "Rake" and "Search" instructions correlation unit 512 performs up to 512 2-bit PN*8-bit I/Q complex multiplies per clock cycle. Correlation unit 512 performs 8-bit and 16-bit Sum-of-Absolute-Difference (SAD) calculations performing up to 512 SADs per clock cycle. Correlation unit 512 performs horizontal add and horizontal min/max instructions. Correlation unit 512 performs vector permute instructions. Correlation unit 512 includes contains 8 256-bit wide control registers. These control registers are used to control the operations of certain correlation unit instructions. Correlation unit 512 may access global scalar register file 521, global vector register file 522 and shared .M and C. local register file 523 in a manner described below. Forwarding multiplexer 530 mediates the data transfer between global scalar register file 521, global vector register file 522, the corresponding streaming engine and correlation unit 512.

CPU 500 includes two arithmetic units: arithmetic unit 513 (.L) and arithmetic unit 514 (.S). Each arithmetic unit 513 and arithmetic unit 514 accepts up to two vector operands and produces one vector result. The compute units support these major operations. Arithmetic unit 513 and arithmetic unit 514 perform various single-instruction-multiple-data (SIMD) fixed point arithmetic operations with precision ranging from 8-bit to 64-bits. Arithmetic unit 513 and arithmetic unit 514 perform various vector compare and minimum/maximum instructions which write results directly to predicate register file 526 (further described below). These comparisons include A=B, A>B, A≥B, A<B and A≤B. If the comparison is correct, a 1 bit is stored in the corresponding bit position within the predicate register. If the comparison fails, a 0 is stored in the corresponding bit position within the predicate register. Vector compare instructions assume byte (8 bit) data and thus generate 32 single bit results. Arithmetic unit 513 and arithmetic unit 514 perform various vector operations using a designated predicate register as explained below.

Arithmetic unit 513 and arithmetic unit 514 perform various SIMD floating point arithmetic operations with precision ranging from half-precision (16-bits), single precision (32-bits) to double precision (64-bits). Arithmetic unit 513 and arithmetic unit 514 perform specialized instructions to speed up various algorithms and functions. Arithmetic unit 513 and arithmetic unit 514 may access global scalar register file 521, global vector register file 522, shared .L and .S local register file 524 and predicate register file 526. Forwarding multiplexer 530 mediates the data transfer between global scalar register file 521, global vector register file 522, the corresponding streaming engine and arithmetic units 513 and 514.

Load/store unit 515 (.D) is primarily used for address calculations. Load/store unit 515 is expanded to accept scalar operands up to 64-bits and produces scalar result up to 64-bits. Load/store unit 515 includes additional hardware to perform data manipulations such as swapping, pack and unpack on the load and store data to reduce workloads on the other units. Load/store unit 515 can send out one load or store request each clock cycle along with the 44-bit physical address to level one data cache (L1D). Load or store data width can be 32-bits, 64-bits, 256-bits or 512-bits. Load/store unit 515 supports these major operations: 64-bit SIMD arithmetic operations; 64-bit bit-wise logical operations; and scalar and vector load and store data manipulations. Load/store unit 515 preferably includes a micro-TLB (table look-aside buffer) block to perform address translation from a 48-bit virtual address to a 44-bit physical address. Load/store unit 515 may access global scalar register file 521, global vector register file 522 and .D local register file 525 in a manner described below. Forwarding multiplexer 530 mediates the data transfer between global scalar register file 521, global vector register file 522, the corresponding streaming engine and load/store unit 515.

Branch unit 516 (.B) calculates branch addresses, performs branch predictions, and alters control flows dependent on the outcome of the prediction.

Predication unit 517 (.P) is a small control unit which performs basic operations on vector predication registers. Predication unit 517 has direct access to the vector predication registers 526. Predication unit 517 performs different bit operations on the predication registers such as AND, ANDN, OR, XOR, NOR, BITR, NEG, SET, BITCNT (bit count), RMBD (right most bit detect), BIT Decimate and Expand, etc.

Figure 6:
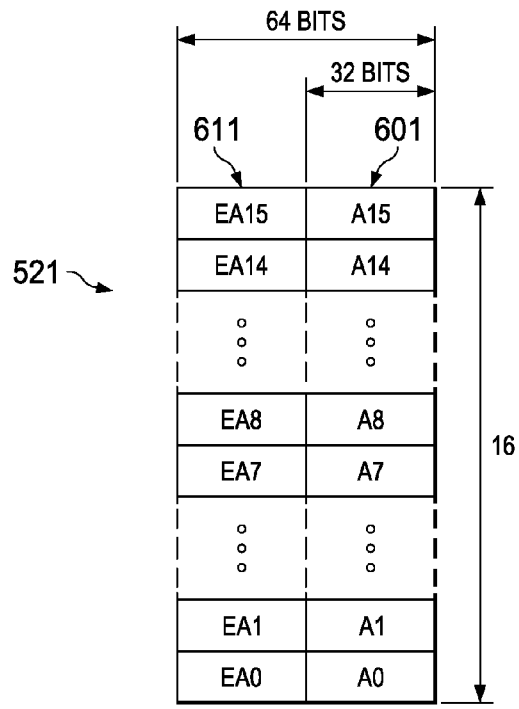
FIG. 6 illustrates the global scalar register file.

FIG. 6 illustrates global scalar register file 521. There are 16 independent 64-bit wide scalar registers. Each register of global scalar register file 521 can be read as 32-bits scalar data (designated registers A0 to A15 601) or 64-bits of scalar data (designated registers EA0 to EA15 611). However, writes are always 64-bit, zero-extended to fill up to 64-bits if needed. All scalar instructions of all functional units can read or write to global scalar register file 521. The instruction type determines the data size. Global scalar register file 521 supports data types ranging in size from 8-bits through 64-bits. A vector instruction can also write to the 64-bit global scalar registers 521 with the upper 192 bit data of the vector discarded. A vector instruction can also read 64-bit data from the global scalar register file 511. In this case the operand is zero-extended in the upper 192-bit to form an input vector.

Figure 7:
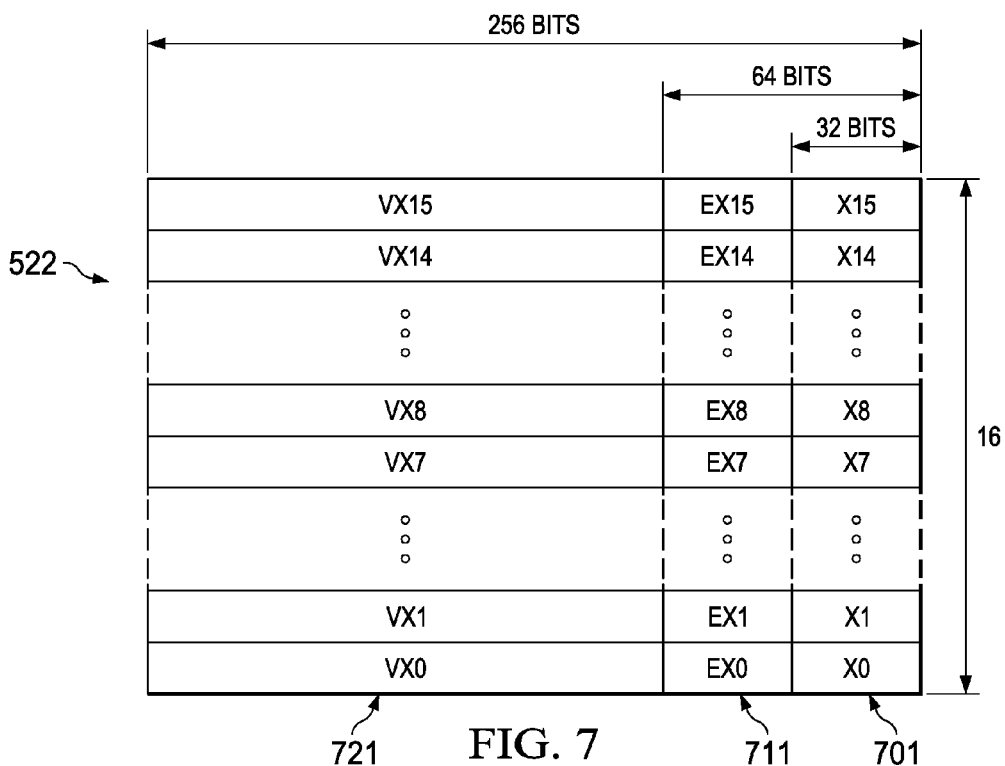
FIG. 7 illustrates global vector register file.

FIG. 7 illustrates global vector register file 522. There are 16 independent 256-bit wide vector registers. Each register of global vector register file 522 can be read as 32-bits scalar data (designated registers X0 to X15 701), 64-bits of scalar data (designated registers EX0 to EX15 711), 256-bit vector data (designated registers VX0 to VX15 721) or 512-bot double vector data (designated DVX0 to DVM7, not illustrated). In the current embodiment only multiply unit 511 and correlation unit 512 may execute double vector instructions. All vector instructions of all functional units can read or write to global vector register file 522. Any scalar instruction of any functional unit can also access the low 32 or 64 bits of a global vector register file 522 register for read or write. The instruction type determines the data size.

FIG. 8 illustrates local vector register file 523. There are 16 independent 256-bit wide vector registers. Each register of local vector register file 523 can be read as 32-bits scalar data (designated registers M0 to M15 801), 64-bits of scalar data (designated registers EM0 to EM15 811), 256-bit vector data (designated registers VM0 to VM15 821) or 512-bit double vector data (designated DVM0 to DVM7, not illustrated). In the current embodiment only multiply unit 511 and correlation unit 512 may execute double vector instructions. All vector instructions of all functional units can write to local vector register file 523. Only instructions of multiply unit 511 and correlation unit 512 may read from local vector register file 523. The instruction type determines the data size.

Multiply unit 511 may operate upon double vectors (512-bit data). Multiply unit 511 may read double vector data from and write double vector data to global vector register file 521 and local vector register file 523. Register designations DVXx and DVMx are mapped to global vector register file 521 and local vector register file 523 as follows.

TABLE 1

| Instruction Designation | Register Accessed |
| --- | --- |
| DVX0 | VX1:VX0 |
| DVX1 | VX3:VX2 |
| DVX2 | VX5:VX4 |
| DVX3 | VX7:VX6 |
| DVX4 | VX9:VX8 |
| DVX5 | VX11:VX10 |
| DVX6 | VX13:VX12 |
| DVX7 | VX15:VX14 |
| DVM0 | VM1:VM0 |
| DVM1 | VM3:VM2 |
| DVM2 | VM5:VM4 |
| DVM3 | VM7:VM6 |
| DVM4 | VM9:VM8 |
| DVM5 | VM11:VM10 |
| DVM6 | VM13:VM12 |
| DVM7 | VM15:VM14 |

Each double vector designation maps to a corresponding pair of adjacent vector registers in either global vector register 522 or local vector register 523. Designations DVX0 to DVX7 map to global vector register 522. Designations DVM0 to DVM7 map to local vector register 523.

Local vector register file 524 is similar to local vector register file 523. There are 16 independent 256-bit wide vector registers. Each register of local vector register file 524 can be read as 32-bits scalar data (designated registers L0 to L15), 64-bits of scalar data (designated registers EL0 to EL15 711) or 256-bit vector data (designated registers VL0 to VL15). All vector instructions of all functional units can write to local vector register file 524. Only instructions of arithmetic unit 513 and arithmetic unit 514 may read from local vector register file 524.

FIG. 9 illustrates local register file 525. There are 16 independent 64-bit wide registers. Each register of local register file 525 can be read as 32-bits scalar data (designated registers D0 to D15 901) or 64-bits of scalar data (designated registers ED0 to ED15 911). All scalar and vector instructions of all functional units can write to local register file 525. Only instructions of load/store unit 515 may read from local register file 525. Any vector instructions can also write 64-bit data to local register file 525 with the upper 192 bit data of the result vector discarded. Any vector instructions can also read 64-bit data from the 64-bit local register file 525 registers. The return data is zero-extended in the upper 192-bit to form an input vector. The registers of local register file 525 can only be used as addresses in load/store instructions, not as store data or as sources for 64-bit arithmetic and logical instructions of load/store unit 515.

FIG. 10 illustrates the predicate register file 517. There are sixteen registers 32-bit registers in predicate register file 517. Predicate register file 517 contains the results from vector comparison operations executed by either arithmetic and is used by vector selection instructions and vector predicated store instructions. A small subset of special instructions can also read directly from predicate registers, performs operations and write back to a predicate register directly. There are also instructions which can transfer values between the global register files (521 and 522) and predicate register file 517. Transfers between predicate register file 517 and local register files (523, 524 and 525) are not supported. Each bit of a predication register (designated P0 to P15) controls a byte of a vector data. Since a vector is 256-bits, the width of a predicate register equals 256/8=32 bits. The predicate register file can be written to by vector comparison operations to store the results of the vector compares.

A CPU such as CPU 110, 210, 220, 310, 410 or 420 operates on an instruction pipeline. This instruction pipeline can dispatch up to nine parallel 32-bits slots to provide instructions to the seven execution units (multiply unit 511, correlation unit 512, arithmetic unit 513, arithmetic unit 514, load/store unit 515, branch unit 516 and predication unit 517) every cycle. Instructions are fetched in instruction packets of fixed length further described below. All instructions require the same number of pipeline phases for fetch and decode, but require a varying number of execute phases.

Figure 11:
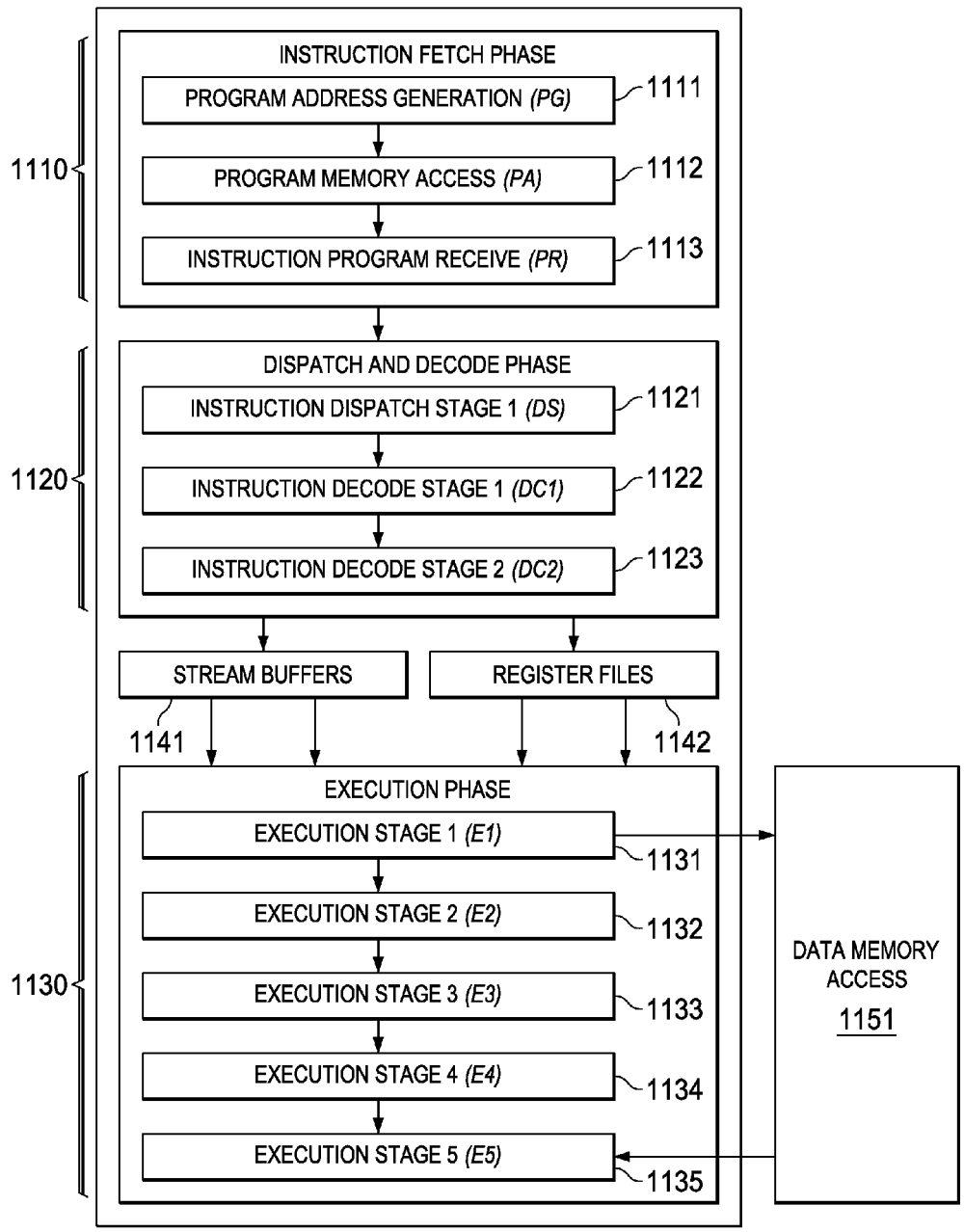
FIG. 11 illustrates the pipeline phases of the central processing unit according to a preferred embodiment of this invention.

FIG. 11 illustrates the following pipeline phases: program fetch phase 1110, dispatch and decode phases 1110 and execution phases 1130. Program fetch phase 1110 includes three stages for all instructions. Dispatch and decode phases include three stages for all instructions. Execution phase 1130 includes one to four stages dependent on the instruction.

Fetch phase 1110 includes program address generation stage 1111 (PG), program access stage 1112 (PA) and program receive stage 1113 (PR). During program address generation stage 1111 (PG), the program address is generated in the CPU and the read request is sent to the memory controller for the level one instruction cache L1I. During the program access stage 1112 (PA) the level one instruction cache L1I processes the request, accesses the data in its memory and sends a fetch packet to the CPU boundary. During the program receive stage 1113 (PR) the CPU registers the fetch packet.

Figure 12:
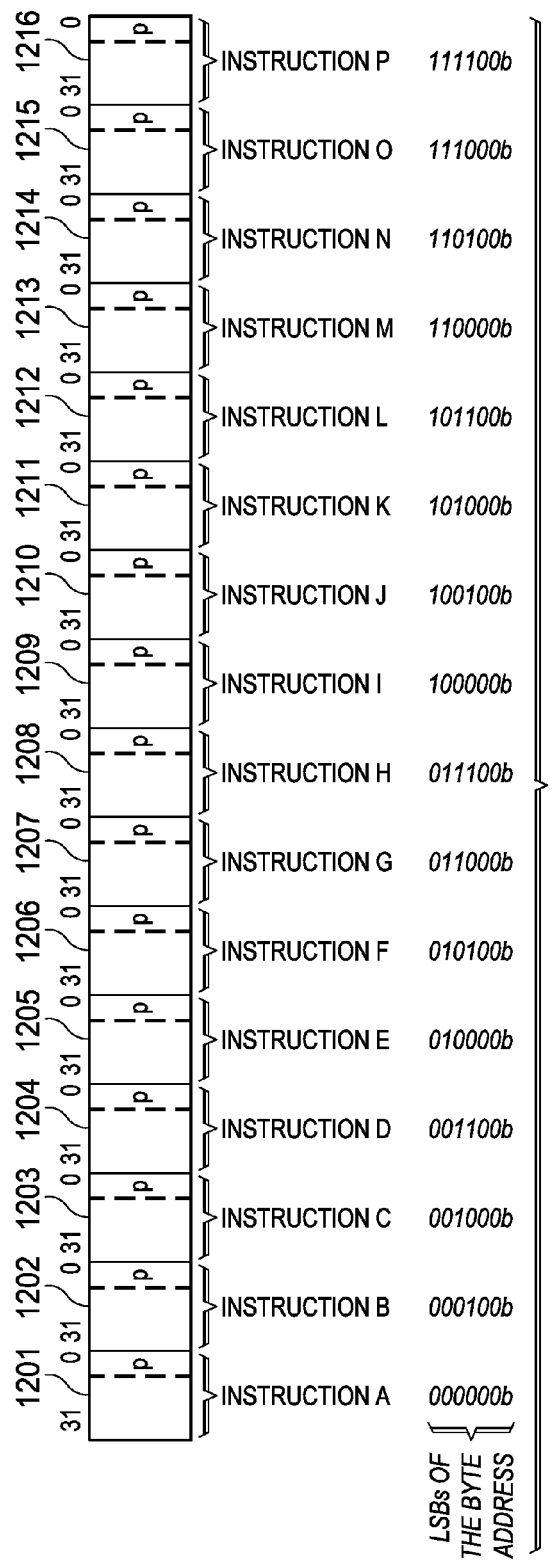
FIG. 12 illustrates sixteen instructions of a single fetch packet.

Instructions are always fetched sixteen words at a time. FIG. 12 illustrates this fetch packet. FIG. 12 illustrates 16 instructions 1201 to 1216 of a single fetch packet. Fetch packets are aligned on 512-bit (16-word) boundaries. The execution of the individual instructions is partially controlled by a p bit in each instruction. This p bit is preferably bit 0 of the instruction. The p bit determines whether the instruction executes in parallel with another instruction. The p bits are scanned from lower to higher address. If the p bit of an instruction is 1, then the next following instruction is executed in parallel with (in the same cycle as) that instruction I. If the p bit of an instruction is 0, then the next following instruction is executed in the cycle after the instruction. All instructions executing in parallel constitute an execute packet. An execute packet can contain up to nine instructions. Each instruction in an execute packet must use a different functional unit. An execute packet can contain up to nine 32-bit wide slots. A slot can either be a self-contained instruction or expand the constant field specified by the immediate preceding instruction. A slot can be used as conditional codes to apply to the instructions within the same fetch packet. A fetch packet can contain up to 2 constant extension slots and one condition code extension slot.

There are up to 11 distinct instruction slots, but scheduling restrictions limit to 9 the maximum number of parallel slots. The maximum nine slots are shared as follows: multiply unit 511; correlation unit 512; arithmetic unit 513; arithmetic unit 514; load/store unit 515; branch unit 516 shared with predicate unit 517; a first constant extension; a second constant extension; and a unit less instruction shared with a condition code extension. The last instruction in an execute packet has a p bit equal to 0.

The instruction stream completely specifies the execute sequence of the CPU. There is no decision by the CPU at run time on the scheduling of instructions. The program generation tools (compiler, linker, etc.) must know the latency of all instructions for proper scheduling. For example, the program must wait two instruction cycles for most multiply instructions to complete. Thus the program generation tools will not schedule use of the result of multiply unit 511 until the second following instruction cycle.

The CPU and level one instruction cache L1I pipelines are de-coupled from each other. Fetch packet returns from level one instruction cache L1I can take different number of clock cycles, depending on external circumstances such as whether there is a hit in level one instruction cache L1I. Therefore program access stage 1112 (PA) can take several clock cycles instead of 1 clock cycle as in the other stages.

Dispatch and decode phases 1110 include instruction dispatch to appropriate execution unit stage 1121 (DS), instruction pre-decode stage 1122 (D1); and instruction decode, operand reads stage 1222 (D2). During instruction dispatch to appropriate execution unit stage 1121 (DS) the fetch packets are split into execute packets and assigned to the appropriate functional units. During the instruction pre-decode stage 1122 (D1) the source registers, destination registers, and associated paths are decoded for the execution of the instructions in the functional units. During the instruction decode operand reads stage 1222 (D2) more detail unit decodes are done, as well as reading operands from the register files.

Execution phases 1130 includes execution stages 1131 to 1135 (E1 to E5). Different types of instructions require different numbers of these stages to complete their execution. These stages of the pipeline play an important role in understanding the device state at CPU cycle boundaries.

During execute 1 stage 1131 (E1) the conditions for the instructions are evaluated and operands are operated on. As illustrated in FIG. 11, execute 1 stage 1131 may receive operands from a stream buffer 1141 and one of the register files shown schematically as 1142. For load and store instructions, address generation is performed and address modifications are written to a register file. For branch instructions, branch fetch packet in PG phase is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after execute 1 stage 1131.

During execute 2 stage 1132 (E2) load instructions send the address to memory. Store instructions send the address and data to memory. Single-cycle instructions that saturate results set the SAT bit in the control status register (CSR) if saturation occurs. For 2-cycle instructions, results are written to a destination register file.

During execute 3 stage 1133 (E3) data memory accesses are performed. Any multiply instructions that saturate results set the SAT bit in the control status register (CSR) if saturation occurs. For 3-cycle instructions, results are written to a destination register file.

During execute 4 stage 1134 (E4) load instructions bring data to the CPU boundary. For 4-cycle instructions, results are written to a destination register file.

During execute 5 stage 1135 (E5) load instructions write data into a register. This is illustrated schematically in FIG. 11 with input from memory 1151 to execute 5 stage 1135.

Figure 13:
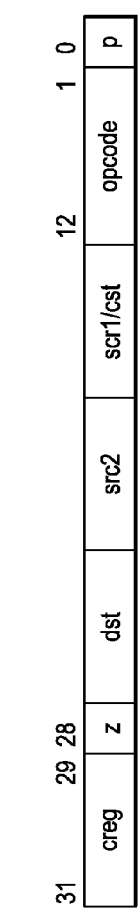
FIG. 13 illustrates an example of the instruction coding of instructions used by this invention.

FIG. 13 illustrates an example of the instruction coding of instructions used by this invention. Each instruction consists of 32 bits and controls the operation of one of the individually controllable functional units (multiply unit 511, correlation unit 512, arithmetic unit 513, arithmetic unit 514, load/store unit 515). The bit fields are defined as follows. The creg field and the z bit are optional fields used in conditional instructions. These bits are used for conditional instructions to identify the predicate register and the condition. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field and the z field are encoded in the instruction as shown in Table 2.

TABLE 2

| | Conditional Register | | | |
|---|---|---|---|---|
| | creg | | | z |
| | 31 | 30 | 29 | 28 |
| Unconditional | 0 | 0 | 0 | 0 |
| Reserved | 0 | 0 | 0 | 1 |
| A0 | 0 | 0 | 1 | z |
| A1 | 0 | 1 | 0 | z |
| A2 | 0 | 1 | 1 | z |
| A3 | 1 | 0 | 0 | z |
| A4 | 1 | 0 | 1 | z |
| A5 | 1 | 1 | 0 | z |
| Reserved | 1 | 1 | x | x |

Note that "z" in the z bit column refers to the zero/not zero comparison selection noted above and "x" is a don't care state. This coding can only specify a subset of the 16 global scalar registers as predicate registers. This selection was made to preserve bits in the instruction coding. Note that unconditional instructions do not have these optional bits. For unconditional instructions these bits (28 to 31) are preferably used as additional opcode bits. However, if needed, an execute packet can contain a unique 32-bit condition code extension slot which contains the 4-bit creg/z fields for the instructions which are in the same execute packet. Table 3 shows the coding of such a condition code extension slot.

TABLE 3

| Bits | Functional Unit |
|---|---|
| 3:0 | .L |
| 7:4 | .S |
| 11:5 | .D |
| 15:12 | .M |
| 19:16 | .C |
| 23:20 | .B |
| 28:24 | Reserved |
| 31:29 | Reserved |

Thus the condition code extension slot specifies bits decoded in the same way the creg/z bits assigned to a particular functional unit in the same execute packet.

Special vector predicate instructions use the designated predicate register to control vector operations. In the current embodiment all these vector predicate instructions operate on byte (8 bit) data. Each bit of the predicate register controls whether a SIMD operation is performed upon the corresponding byte of data. The operations of predicate unit 517 permit a variety of compound vector SIMD operations based upon more than one vector comparison. For example a range determination can be made using two comparisons. A candidate vector is compared with a first vector reference having the minimum of the range packed within a first data register. A second comparison of the candidate vector is made with a second reference vector having the maximum of the range packed within a second data register. Logical combinations of the two resulting predicate registers would permit a vector conditional operation to determine whether each data part of the candidate vector is within range or out of range.

The dst field specifies a register in a corresponding register file as the destination of the instruction results.

The src2 field specifies a register in a corresponding register file as the second source operand.

The src1/cst field has several meanings depending on the instruction opcode field (bits 2 to 12 and additionally bits 28 to 31 for unconditional instructions). The first meaning specifies a register of a corresponding register file as the first operand. The second meaning is an immediate constant. Depending on the instruction type, this is treated as an unsigned integer and zero extended to a specified data length or is treated as a signed integer and sign extended to the specified data length.

The opcode field (bits 2 to 12 for all instructions and additionally bits 28 to 31 for unconditional instructions) specifies the type of instruction and designates appropriate instruction options. This includes designation of the functional unit and operation performed. A detailed explanation of the opcode is beyond the scope of this invention except for the instruction options detailed below.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

Correlation unit 512 and arithmetic units 513 and 514 often operate in a single instruction multiple data (SIMD) mode. In this SIMD mode the same instruction is applied to packed data from the two operands. Each operand holds plural data elements disposed in predetermined slots. SIMD operation is enabled by carry control at the data boundaries. Such carry control enables operations on varying data widths.

Figure 14:
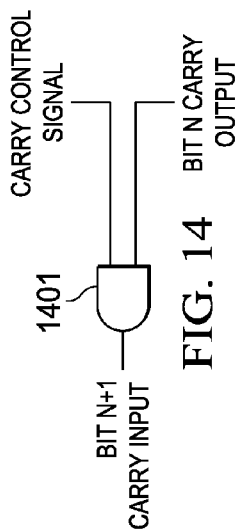
FIG. 14 illustrates the carry control for SIMD operations according to this invention.

FIG. 14 illustrates the carry control. AND gate 1401 receives the carry output of bit N within the operand wide arithmetic logic unit (256 bits for arithmetic units 513 and 514, 512 bits for correlation unit 512). AND gate 1401 also receives a carry control signal which will be further explained below. The output of AND gate 1401 is supplied to the carry input of bit N+1 of the operand wide arithmetic logic unit. AND gates such as AND gate 1401 are disposed between every pair of bits at a possible data boundary. For example, for 8-bit data such an AND gate will be between bits 7 and 8, bits 15 and 16, bits 23 and 24, etc. Each such AND gate receives a corresponding carry control signal. If the data size is of the minimum, then each carry control signal is 0, effectively blocking carry transmission between the adjacent bits. The corresponding carry control signal is 1 if the selected data size requires both arithmetic logic unit sections. Table 4 below shows example carry control signals for the case of a 256 bit wide operand such as used in arithmetic units 513 and 514 which may be divided into sections of 8 bits, 16 bits, 32 bits, 64 bits or 128 bits. No control of the carry output of the most significant bit is needed, thus only 31 carry control signals are required.

TABLE 4

| Data Size | Carry Control Signals |
|---|---|
| 8 bits | -000 0000 0000 0000 0000 0000 0000 0000 |
| 16 bits | -101 0101 0101 0101 0101 0101 0101 0101 |
| 32 bits | -111 0111 0111 0111 0111 0111 0111 0111 |
| 64 bits | -111 1111 0111 1111 0111 1111 0111 1111 |
| 128 bits | -111 1111 1111 1111 0111 1111 1111 1111 |
| 256 bits | -111 1111 1111 1111 1111 1111 1111 1111 |

It is typical in the art to operate on data sizes that are integral powers of 2 ($2^N$). However, this carry control technique is not limited to integral powers of 2. One skilled in the art would understand how to apply this technique to other data sizes and other operand widths.

One requirement of digital signal processors is data to operate upon. Loading data as early as possible is very useful for increasing the speed of the system. If the data is not in the cache when requested by the program, execution of the algorithm must wait until the data is retrieved from memory. This could be a lengthy process and thus reduce the operating speed of the system. The program compiler can speculatively hoist a load up early in the instruction stream to help reduce this latency. Such an early load ensures the data is available when required by the CPU.

For this technique to work well the speculatively loaded data must match the data needed by the algorithm. In many cases, the compiler schedules the speculative load before being sure the address is correct. In such cases the identity of the data may not be known at the time of the speculative load. This is a greater hazard for algorithms that include conditional branching. For example, the register storing the load address may be written to between the speculative load and the position of the original load.

The speculative load operates on the best current information of the location of the needed data. If this guess is correct, then the speculative load hides the memory access latency. If the guess is incorrect, data must be loaded again to replace the erroneous speculatively loaded data. Assuming the speculative load confirmation occurs at the same time as the original load would have occurred, no time is lost due to the speculative load. The only loss is effort directed to the unhelpful speculative load.

Generally in the prior art speculative load schemes require more than one step. In a first step, the compiler moves a load further up in the instruction stream. In a second step, the compiler places a check load instruction in the original location of the load. This check load instruction is tied to the speculative load. When the program reaches the check load instruction (third step), the speculative load address is compared with the load address now assumed to be correct. If they are identical, then the speculative load is correct. If they differ, then the speculative load is typically discarded in favor of a new load. Another prior art approach uses a poison bit mechanism. A poison bit is attached to the speculatively loaded data and passed along until the load data is used. On encountering data having such a poison bit, the program takes appropriate remedial measures to avoid using the incorrect data.

The compiler of this invention operates on similar principles as the prior art. It is advantageous to schedule loads earlier in the instruction stream than later. Scheduling a data load before the data is needed can hide fetch latency variations. Another principle is not to take any algorithm behavior changing action before confirming a speculative load was correct. This condition may limit the number of loads that can be moved up the instruction stream depending on downstream behavior. This invention recognizes that confirmation of a speculative load need not rely solely upon the fetch address being correct. The confirmation condition could be another single condition or a compound condition.

Figure 15:
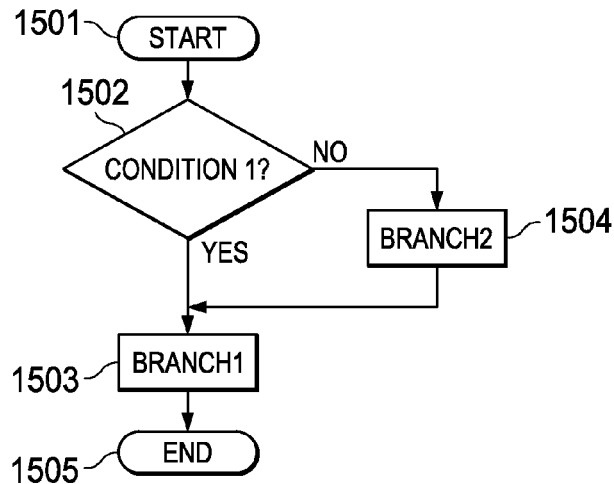
FIG. 15 illustrates a common program scenario in the prior art.

This invention may be usefully employed for improved execution of a common program scenario illustrated in FIG. 15. The program fragment begins with start block 1501. Test block 1502 determines whether condition1 is true. If condition1 is true (Yes at test block 1502), then block 1503 executes Branch1. If condition1 is false (No at test block 1502), then block 1504 executes Branch2. These branches merge and the program fragment ends at end block 1505. This might be specified by the following code fragment.

```
If cond1
    Then Branch1
    Else Branch2
End if
```

Suppose that both Branch1 and Branch2 include a load instruction. It may be valuable to schedule an earlier speculative load of this data. It may also be the case that the data and the address of the data for both branches is stable. Thus the speculative loads always return correct data.

Figure 16:
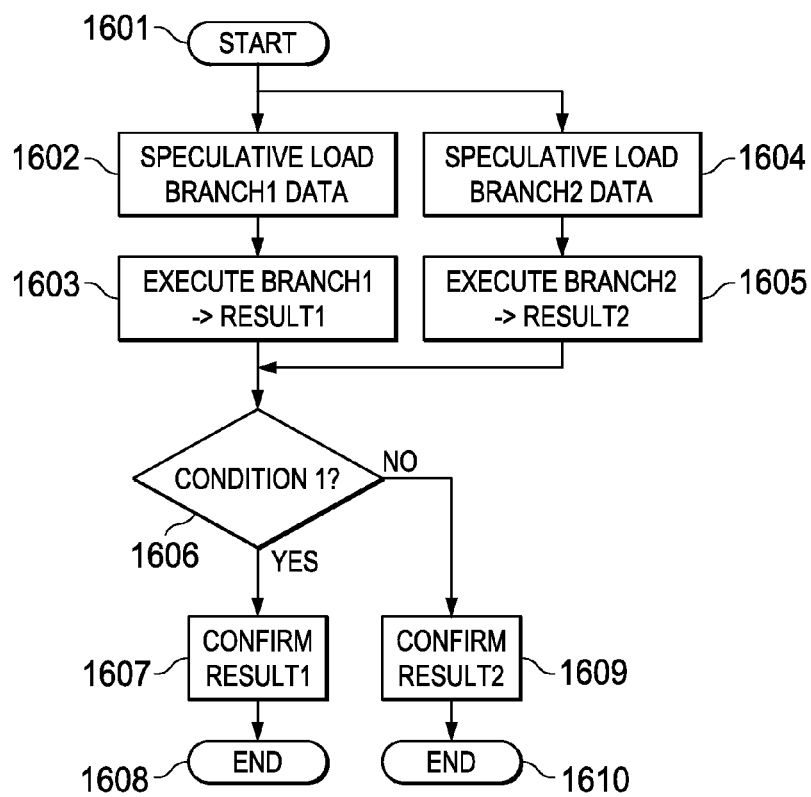
FIG. 16 illustrates scheduling according to this invention for the program scenario of FIG. 15.

FIG. 16 illustrates scheduling according to this invention. The program fragment modified according to this invention begins with start block 1601. Block 1602 speculatively loads data for Branch1. Block 1603 performs the logic of Branch1 using the speculatively loaded data and produces Result1. In parallel with blocks 1602 and 1601, block 1604 speculatively loads data for Branch2 and block 1605 performs the logic of Branch2 using the speculatively loaded data and produces Result2. CPU 500 (FIG. 5) may include enough functional units to schedule operation for both branches simultaneously employing separate register sub-sets. It may be possible to schedule execution of Branch2 on functional units that would be idle if executing only Branch1. Thus it may be feasible to schedule execution of both branches simultaneously using no more instruction cycles than executing one branch alone.

Test block 1606 determines whether condition1 is true. If condition1 is true (Yes at test block 1606), then block 1607 confirms Result1. In this context confirmation of Result1 involves some action that changes algorithm behavior for downstream code. This could be a write to memory, storage of data into a register used downstream without an intervening data storage or a program control change such as branching to another program module. The program fragment ends at end block 1608. If condition1 is false (No at test block 1606), then block 1609 confirms Result2. The program fragment ends at end block 1610. Note in this context confirmation of Result1 involves disaffirming Result2 and vice versa. In this example Result2 is discarded upon confirmation of Result1 and Result1 is discarded upon confirmation of Result2. Note that though FIG. 16 illustrates separate ends (1608 and 1610) for the two branches, the program flow may merge here such that end blocks 1608 and 1610 are merged.

Figure 17:
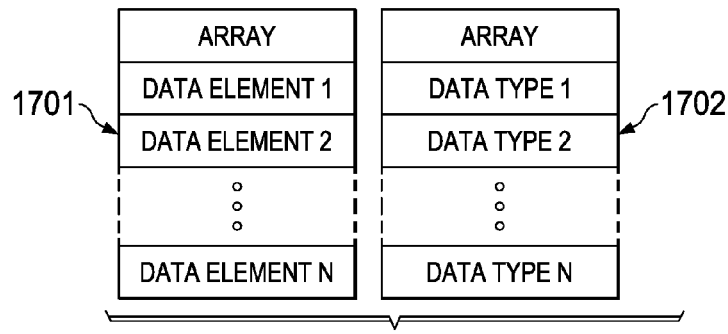
FIG. 17 illustrates another scenario for which this invention is advantageous.

FIG. 17 illustrates another scenario for which this invention is advantageous. FIG. 17 illustrates two arrays 1701 and 1702. Array 1701 stores N data elements. Array 1702 stores N data types. For each data element of array 1701 the corresponding element in array 1702 stores a data type. This data type could be an indication of whether the data element is an unsigned integer, a signed integer, a floating point number or the data size (8 bit, 16 bit, 32 bit, 64 bit, 128 bit etc.). Suppose the algorithm in question performs the same operation upon each data element independent of data type. The data type and perhaps that data size determines which instruction is needed and sometimes determines which functional unit is needed. The compiler could schedule loading the data elements speculatively and provide branches for calculation dependent upon data type. FIG. 16 could be modified to include three or more parallel branches. Then for each data element the corresponding data type stored in array 1702 is read and the branch corresponding to that data type is confirmed.

The data stored in array 1702 could be an indication that the corresponding data element in array 1701 is valid or invalid. Operations on speculatively loaded data from array 1701 proceeds assuming the data is valid. The condition check is the valid/invalid as indicated by the indication in array 1702. If the data was valid, the operations on the data are confirmed and the program may take an action changing downstream behavior. If the data was invalid, the program disaffirms the calculations on the speculatively loading data not taking action changing downstream behavior.

This invention differs from the prior art in the nature of the speculative load confirmation. In the prior art, a check load instruction determines whether the corresponding prior speculative load instruction used the correct load address. In the example of FIG. 16 test block 1606 tests a condition unrelated to the correctness of the speculative load. The condition of test block 1606 comes from the original algorithm (test block 1502). This condition does not depend upon the correctness of the speculative load. In general this condition check could be a simple or compound condition. A compound condition may include as one of the subset conditions the correctness of the speculative load address. This condition does not consist solely the correctness of the speculative load address.

Figure 18A:
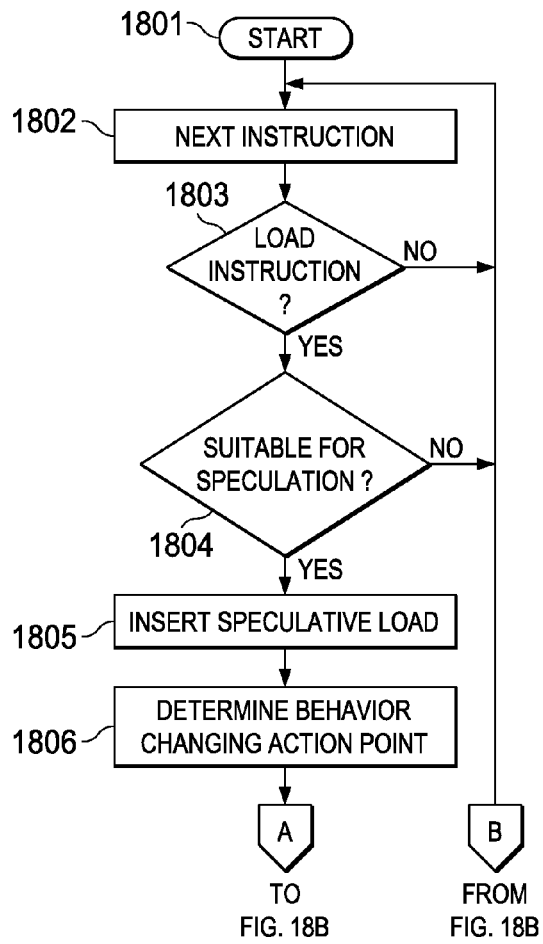
FIGS. 18A and 18B together illustrate compiler operation in accordance with this invention.
Figure 18B:
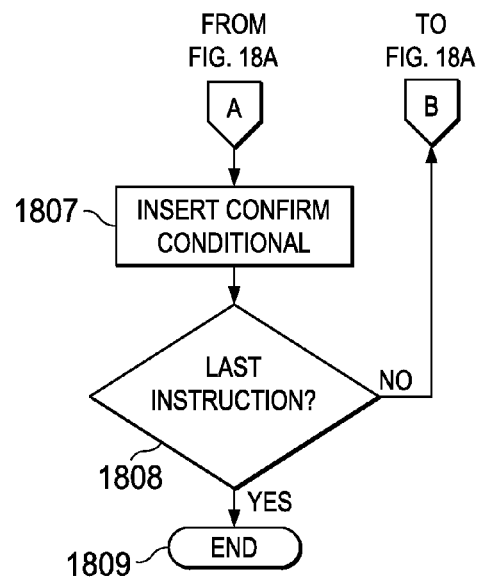

FIGS. 18A and 18B together illustrate compiler operation in accordance with this invention. In general a compiler receives high level language source code as input and generates object code capable of being executed by the target data processor. In this case this process includes static scheduling by assembling execute packets of instructions that can operate in parallel. This scheduling process is known in the art and will not be further described except as necessary to understand this invention.

The compiler process of this invention starts at start block 1801. The process considers the next instruction in the source code in block 1802. For the first time through this loop the next instruction is the first instruction. Test block 1803 determines if this instruction is a load instruction. If not (No at test block 1803), then the process goes to block 1802 to consider the next instruction.

If the current instruction is a load instruction (Yes at test block 1803), then test block 1804 determines if the current load instruction is suitable for load speculation. If not (No at test block 1804), then the process goes to block 1802 to consider the next instruction.

If the current load instruction is suitable for load speculation (Yes at test block 1804), then block 1805 inserts a speculative load instruction. As previously described the speculative load instruction is inserted before the location of the original load instruction. The insertion point is preferably after a point where there is a good chance that the pointer value is good. The insertion point is also preferably far enough upstream that the speculatively loaded data will be available when first requested. This insertion replaces the original load instruction which is deleted from the stream.

Block 1806 determines a behavior changing action point downstream of the speculative load insertion. As previously described this point is the first point in the instruction stream where the algorithm changes behavior based on the speculative load. This could be a write to memory, storage of a value into a register or a program branch.

Block 1807 inserts the appropriate conditional before the behavior changing action point. As noted above this conditional determines whether to commit the program behavior deriving from the speculative load. This conditional could be simple or compound and does not depend solely upon the correctness of the speculative load address. Insertion of this conditional should also take into account any branch behavior such as discussed in conjunction with FIG. 16. This may include parallel scheduling of two or more program branches conditional instructions having orthogonal conditions. Generally this conditional will derive from some program behavior as discussed above in conjunction with FIGS. 15 and 16.

Test block 1808 determines if the current load instruction is the last instruction to be considered. If this is not the last instruction (No at test block 1808), then the process goes to block 1802 to consider the next instruction. If this is the last instruction (Yes at test block 1808), then the process ends at block 1809.

Figure 19:
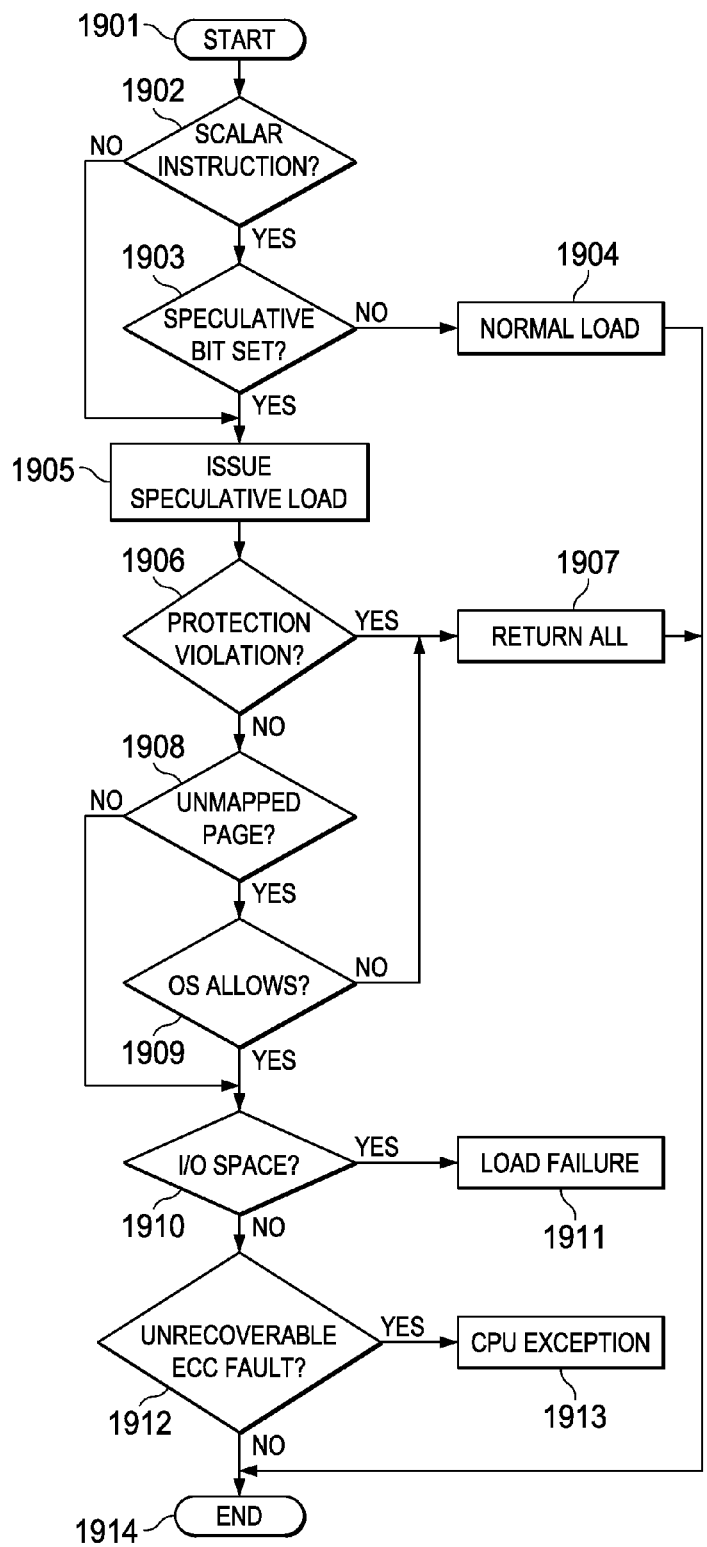
FIG. 19 illustrates the speculative load process of this invention.

In this invention speculative loads are handled as illustrated in FIG. 19 which shows the operation of load/store unit 515 in response to a load command. FIG. 19 begins at start block 1901. Test block 1902 determines if the current load instruction is a scalar load. Scalar loads instruction may be either speculative or non-speculative. An instruction bit indicates whether the load is speculative. If the load instruction is a scalar load instruction (Yes at test block 1902) then test block 1903 determines the state of this instruction bit. If this bit is not set (No at test block 1903), then block 1904 issues a normal load. This process then ends at end block 1914.

In accordance with this invention, all vector loads are speculative loads. If the current load instruction is a vector load (No at test block 1902) or if it is a scalar load with the speculative bit set (Yes at test block 1903), then block 1905 issues the speculative load.

Test block 1906 determines whether the speculative load triggers a memory protection violation. If a memory protection violation triggers (Yes at test block 1906), then block 1907 finishes the load by returning all zeros. This process then ends at end block 1914.

Test block 1908 determines whether the speculative load is to an unmapped page table. If this is the case (Yes at test block 1908), then test block 1909 determines whether the operating system (OS) will allow access to the currently unmapped page. If the OS does not permit this access (No at test block 1909), then block 1907 finishes the load by returning all zeros. This process then ends at end block 1914. If the OS permits this access (Yes at test block 1909), then the speculative load is permitted. Opening an unmapped page will typically require a new entry in a table look-aside buffer (TLB). This process is typically handled by the OS. This process may be made optional in the program. Thus the program may always return the predetermined data on access to an unmapped page without consulting the OS in a first option. In a second option the program consults the OS as described above and permits the OS to determine whether to open the unmapped page.

If the speculative load is not to an unmapped page (No at test block 1908) or this access is permitted by the OS (Yes at test block 1909), then test block 1901 determines whether the speculative load is from a memory mapped input/output (I/O) space. If the speculative load is from a memory mapped I/O space (Yes at test block 1910), then block 1911 triggers a load failure. The system has no control over the data from a memory mapped I/O space and it is best not to speculatively load from an I/O space. Data at a memory mapped I/O space is typically from an external peripheral. Speculative loads from such devices are typically not helpful.

If the speculative load is not from a memory mapped I/O space (No at test block 1910), then test block 1912 determines whether there is an unrecoverable error correction coding (ECC) error. The memory of the system is protected by an error detection and correction system. Each memory stores additional bits called parity bits. The state of these parity bits depends upon the state of the normal bits. Upon data transfers the parity bits are tested against the normal bits to determine if their relationship is correct. This effectively redundantly codes the data. If a non-allowed code is found, then there is an error in the data stored in the memory. Depending on the number of parity bits some ECC techniques permit correction of some errors. If such an ECC correction occurs (Yes at test block 1912), then block 1913 issues a CPU fault. Under these conditions the data speculatively loaded is incorrect. This is not a fault of the speculative load. Thus a system level response is required.

If none of the conditions occur (No at test block 1912), then the process ends at end block 1914. Data in the register destination of the load instruction is either: the scalar data of a normal load (block 1904); the dummy data (all zeroes) in response to a memory protection violation or an unsupported unmapped page (block 1907); or the speculative data (block 1905). Thus most occurrences of failure of the speculative load will not stop the program. The dummy data will be replaced by the correct data when the speculative load confirmation fails and the data is re-loaded.

This invention is simpler than the prior art by returning zeros and treats faults as non-errors. This is more appropriate for embedded devices. This solution does not require complicated hardware to support and particularly suited for embedded system.

What is claimed is:

1. A method of compiling for a statically scheduled data processing apparatus, said method comprising the steps of:
   receiving a high level language source code of a program;
   determining for each instruction whether the instruction is a load instruction;
   for each instruction determined to be a load instruction, determining whether said load instruction is suitable for speculative loading;
   for each load instruction determined to be suitable for speculative loading
      inserting a speculative load instruction into said program at a point upstream of said load instruction suitable for speculative loading,
      deleting said load instruction suitable for speculative loading,
      determining a point in said program where a program behavior changing action occurs employing data of said speculative load,
      inserting a conditional instruction in said program before said point in said program where a program behavior changing action occurs, said conditional instruction performing one of confirming said speculative load or disaffirming said speculative load based upon a condition not solely dependent upon correctness of a load address of said speculative load instruction.

2. The method of claim 1, wherein:
said step of inserting a speculative load instruction inserts at a point after where there is a good chance that the pointer value is good.

3. The method of claim 1, wherein:
said step of inserting a speculative load instruction inserts at a point far enough upstream that the speculatively loaded data will be available when first requested.

4. The method of claim 1, wherein:
said point in said program where a program behavior changing action is a write to memory.

5. The method of claim 1, wherein:
said point in said program where a program behavior changing action is storage of a value into a register.

6. The method of claim 1, wherein:
said point in said program where a program behavior changing action is a program branch.

7. The method of claim 1, wherein:
said inserted conditional instruction depends upon behavior of said source code of the program.

8. A digital signal processor comprising:
a data register file including a plurality of data registers designed by register number storing data;
an instruction memory storing instructions each specifying a data processing operation and at least one data operand by register number;
an instruction decoder connected to said instruction memory for sequentially recalling instructions from said instruction memory and determining said specified data processing operation and said specified at least one operand;
at least one operational unit connected to said data register file and said instruction decoder for performing data processing operations upon at least one operand corresponding to an instruction decoded by said instruction decoder;
a load unit connected to said data register file and said instruction decoder, said load unit operable in response to a load instruction specifying a first register of said data register file storing an address and a second register of said data register file to speculatively recall data from a memory at said address stored in said first register for storage in said second register, and upon a protection violation from said address in attempting access to the memory, storing a predetermined pattern of bits in said second register.

9. The digital signal processor of claim 8, wherein:
said predetermined pattern of bits is all zeros.

10. The digital signal processor of claim 8, wherein:
said load unit is further operable when said address accesses an unmapped page and an operating system denies access to said unmapped page, storing said predetermined pattern of bits in said second register.

11. The digital signal processor of claim 8, wherein:
said load unit is further operable
when said address accesses an unmapped page and said digital signal processor has a first state to store said predetermined pattern of bits in said second register,
when said address accesses an unmapped page and said digital signal processor has a second state submit said access to an operating system
receiving return data if the operating system permits the access to said unmapped page, and
storing said predetermined pattern of bits in said second register if the operating system denies access to said unmapped page.

12. The digital signal processor of claim 8, wherein:
said load unit is further operable when said address accesses a memory mapped input/output space to generate a load failure.

13. The digital signal processor of claim 8, wherein:
said load unit is further operable to
speculatively load data if a predetermined bit of said load instruction has a first digital state, and
unconditionally load data if said predetermined bit of said load instruction has a second digital state opposite to said first digital state.

14. The digital signal processor of claim 8, wherein:
load instructions include a first type load instruction always speculatively loaded and a second type load instruction having a predetermined bit indicating whether to speculatively load data; and
said load unit is further operable to
speculatively load data if said load instruction is of said first type, and
speculatively load data if said load instruction is of said second type and if said predetermined bit of said load instruction has a first digital state, and
unconditionally load data if said load instruction is of said second type and if said predetermined bit of said load instruction has a second digital state opposite to said first digital state.

15. The digital signal processor of claim 14, wherein:
said first type load instruction is a vector load instruction specifying bits to fill one of said registers of said data register file; and
said second type load instruction is a scalar load instruction specifying bits to fill only a predetermined subset of bits of one of said registers of said data register file.

16. A method of compiling for a statically scheduled data processing apparatus, the method comprising the steps of:
receiving a high level language source code of a program;
identifying in the high language source code an occurrence of a condition test instruction evaluating a condition followed by a first branch instruction block executed when the condition is true and a second branch instruction block executed when the condition is false, both said first branch instruction block and said second branch instruction block including a load instruction;
substituting for said occurrence
a first speculative load instruction corresponding to said load instruction of said first branch instruction block,
a first modified branch instruction block performing operations corresponding to said first branch instruction block employing data of said first speculative load instruction producing a first speculative result,
a second speculative load instruction corresponding to said load instruction of said second branch instruction block,
a second modified branch instruction block performing operations corresponding to said second branch instruction block employing data of said second speculative load instruction producing a second speculative result,
a modified condition test instruction evaluating said condition,
a first confirmation instruction block confirming said first speculative instruction block and disaffirming said second speculative instruction block when the condition is true, and
a second confirmation instruction block confirming said second speculative instruction block and disaffirming said first speculative instruction block when the condition is false.

17. The method of claim 16, further method comprising the steps of:
statically scheduling said first modified branch instruction block and said second modified branch instruction block to execute in parallel.

* * * * *